METHOD AND APPARATUS FOR PRODUCING A STAIR PROTECTIVE TREAD

This invention relates to stair protective treads and, more particularly, to a method and apparatus for making a molded stair protective tread from a flat sheet flooring product having a bottom metallic layer.

In the past, floor coverings of a protective nature have been manufactured from flexible plastic materials having the ability of conforming to the shape of the surface being covered or from metallic based materials which are highly durable over an extended period of time. Unfortunately, the utility of metallic based materials has been confined largely to the covering of flat surfaces due to the fact that methods of bending or molding these materials, heretofore provided, have a tendency to cause unsightly goring or marring of the surface of the covering.

Generally, floor coverings are used over carpeted surfaces in areas or pathways subject to a great deal of traffic. It is especially desirable to protect the carpeting on stairs from wearing thin because of the relatively high expense involved in replacing the carpeting in a small area. Flexible plastic materials have been used almost exclusively as stair treads because of their low cost and the ease of laying a continuous strip of plastic over the series of horizontal and vertical surfaces of a staircase, notwithstanding the fact that such materials are prone to being torn and cut when constantly in use. Previously, the primary disadvantage of using molded metallic based materials as stair treads was their unattractive appearance caused by surface marring due to the various clamping devices used to mold a portion of the tread to fit snugly around the lip of a stair.

It is, therefore, the primary object of this invention to provide a molded stair protective tread from a flat sheet flooring product having a bottom metallic layer, which stair tread fits snugly around the lip of a stair and has a smooth unmarred surface appearance.

Another object of this invention resides in the provision of a stair protective tread which is permanently secured to the horizontal surface of a stair and snugly around its lip by means which are not visible on its surface.

A further object of this invention resides in the provision of a stair protective tread which is extremely sturdy and durable and which does not have to be replaced after it has been securely applied to the horizontal surface of a stair.

An additional object of this invention resides in the provision of a device for making a stair protective tread from a flat sheet flooring product, which device will not mar, scratch, or otherwise injure the surface of the tread.

A still further object of this invention resides in the provision of a device for making a stair protective tread from a flat sheet flooring product, which device is automatically operated by remote control.

Still another object of this invention resides in the provision of a device for making a stair protective tread from a flat sheet flooring product, which device is capable of imparting any desirable contours to the stair tread.

Still further objects and features of the invention reside in the provision of a molded stair tread which is attractive in appearance, easy to install, and capable of being maintained in a clean condition with a minimum amount of effort. Furthermore, the device used to make the molded stair tread is inexpensive to manufacture, is easy to operate, and requires a minimum amount of floor space.

These, together with the various ancillary objects and features of this invention, which will become apparent as the following description proceeds, are attained by this method of forming a molded stair tread and apparatus therefor, preferred embodiments of which have been illustrated in the accompanying drawings, by way of example only, wherein:

FIG. 1 is a top plan view of a device for molding stair treads having a roller of smaller diameter tangentially disposed with respect to a roller of a larger diameter which, as it rotates, forces the smaller diameter roller against a flat sheet flooring product until it is bent to the curvature of the roller having the smaller diameter;

FIG. 2 is an enlarged side elevational view of the device with a flat sheet of flooring product inserted in a slit provided along the entire length of the larger diameter roller just prior to the molding of the flooring product;

FIG. 3 is an enlarged side elevational view of the device and flooring product after the larger diameter roller has been rotated to cause bending of the flat sheet flooring product to the curvature of the smaller diameter roller;

FIG. 4 is an enlarged sectional view of the smaller diameter roller which has had two detachable sleeves placed thereon to increase its effective diameter;

FIG. 5 is a diagrammatic side view of another embodiment of the device having two rollers tangentially disposed along and of smaller diameter than a larger diameter roller, each of the two rollers being of different sizes so that different contours may be provided to the stair tread;

FIG. 6 is a perspective view of a stair protective tread which has been molded from a flat sheet of flooring product having a bottom metallic layer and an upper layer of flooring product in accordance with the concepts of the invention, the downwardly bent portion of the tread being able to fit snugly around the lip of a stair; and, FIG. 7 is an enlarged vertical view in section of the stair protective tread showing the manner in which the tread may be secured to the horizontal surface of a stair without marring its surface appearance.

With continuing reference to the accompanying drawings, particularly with reference to the embodiment shown in FIGS. 1 through 3, wherein like reference numerals designate similar parts throughout the various views, reference numeral 10 is used to generally designate the device of the present invention. The device 10 includes a base, generally designated as 12, which has a bottom 14, and upwardly extending sides 16 and 18. A vertical support member 20, extending between sides 16 and 18, rises from the bottom 14 of the base 12. An elongated shaft 22 also extends between sides 16 and 18 and is secured thereto by journals 24 fastened by screws 26. A first roller 28 is rotatably supported on shaft 22. A second roller 30, having a substantially smaller diameter than the diameter of the first roller 28, is mounted so that it is tangentially disposed with respect to first roller 28 on shaft 22

TUBE ROLLING MILL FOR PRODUCING FINNED TUBING

CROSS-REFERENCE TO RELATED APPLICATIONS

This is an improvement application that is related to application Ser. No. 52,838, filed July 7, 1970, and to application Ser. No. 845,833, filed July 29, 1969, now U.S. Pat. No. 3,611,775.

BACKGROUND OF THE INVENTION

This invention relates generally to a method and apparatus for reducing and elongating metal tubing and more particularly to a method and apparatus for producing finned tubing by a tube reducing process employing cold rolling.

Metal tubing is used in a wide variety of environments and for many different applications. This requires that tubing be available with a wide variety of inside and outside diameters and wall thicknesses. Furthermore, certain applications require that the tube be provided with fins or ribs protruding outwardly from the tube and extending generally along its length. In order to effectively utilize the economies of mass production, metal tubing is initially manufactured in only a few standard sizes without fins. This makes it necessary to modify tubing of a standard manufactured size to obtain a finished tube having an overall size that is needed for a certain application requiring less tubing than can be economically manufactured directly.

A machine for reducing tubing of a standard manufactured size with two rolls and a mandrel is described by Krause in the *Iron and Steel Engineer*, August, 1938, pp. 16–29, and in several patent publications such as U.S. Pat. Nos. 2,161,064, 2,161,065 and 2,223,039. In addition, there have been several disclosures by the Argonne National Laboratories relating to similar machines. Also, several publications by Russian authors have described tube rolling mills having three or six rolls. However, it is not known that any of these disclosures suggest a practical way of forming fins or ribs along the outside of a tube by a cold rolling process. A tube drawing process is presently used commercially to form fins on standard manufactured tubing.

Therefore, it is an object of this invention to provide a tube rolling mill capable of forming fins or ribs on the exterior wall surface of tubing.

It is also an object of this invention to provide a method of forming fins or ribs on the exterior wall surface of tubing by cold rolling.

It is a further object of this invention to provide a method and apparatus for forming fins on the exterior wall surface of a tube as part of a process of reducing the tube's wall thickness and/or its inside diameter.

SUMMARY OF THE INVENTION

These and additional objects are accomplished by a technique according to this invention in which a plurality of rolls are reciprocated back and forth along the length of a standard size manufactured tubing. Each of the rolls has a uniform tube contacting groove around its outer circumference. The plurality of rolls is held by a common roll housing which is reciprocated along the length of the tubing. Cam guide means are provided for the rolls so that they exert a substantial amount of pressure against the tube. It is this pressure against the tube which causes metal of the manufactured tubing to flow into a desired new shape. The plurality of rolls are positioned so that their tube contacting grooves surround the tube being reduced. The roll grooves contact and work all portions of the tube outside surface except for at least one small portion where at least one fin is formed. The tube is not rotated during the reduction process.

According to one aspect of the present invention, fins are formed along the length of the tube as a result of metal flowing up into a space provided between the rolls. The rolls do not contact each other at the tube but rather have a spacing therebetween which determines the size of the fins produced. A number of fins are produced on a tube equal to the number of rolls being operated thereagainst.

In a preferred form of this aspect of the invention, three rolls are utilized in a cluster about the tube with their axes of rotation located in a plane substantially perpendicular to the tube and displaced 120° from each other. Each roll is rotatably attached to a roll housing. The roll is urged against the tube by a pair of cams tracks on which roll trunnions ride. The gaps between rolls, and thus the size of the fins produced for a given roll design, are controlled by the cam shape. Within the roll housing, means are provided to insure that the rolls contact the cams at all times.

In a preferred form of the invention as described hereinafter, fins are formed on a tube in conjunction with either wall thickness reduction or inside diameter reduction, or both, to obtain a finned tube that is dimensioned exactly as required for a particular application. In order to obtain a good quality tube with either wall thickness or inside diameter reduction, or both, it is preferred to use two sets of three roll clusters with a fixed spatial relationship within a roll housing. The axes of rotation of the rolls of one set (cluster) are displaced 60° from the axes of rotation of the rolls of the other set.

According to another aspect of the present invention, a fin forming notch may be provided in one or more rolls entirely around the circumference of the roll contacting groove. The portion of the tube surface contacted by the notch is not reduced as much as remaining portions of the tube outside surface, thereby leaving a fin therealong. Under certain circumstances, metal flows upward into the notch from other portions of the tube to increase the fin size. The use of one or more such notches allows forming a tube with a number of fins greater than the number of rolls.

The techniques of the present invention allow tubing to be produced with fins that extend generally along the length of the tube in straight lines. In some applications, tubes having spiral fins are desired. A spiraled finned tube may be produced by rolling according to the techniques of the present invention, followed by an additional step of twisting the finned tube.

In forming such finned tubing according to the techniques of the present invention, the tube is preferably supported by a mandrel inside thereof. Although such a mandrel is not absolutely necessary in carrying out the present invention, it will result in a tube with a uniform and smooth inside surface as well as allow forming fins of a greater height. The mandrel may have substantially a uniform cross-section along a length in which the tube is worked, thus resulting in a general wall thickness reduction while forming the fins. Alternatively, the mandrel may have a significant taper for reducing the inside diameter of a tube simultaneously with forming fins thereon.

Finned tubing may be produced by the techniques of the present invention with a wide variety of metals including those considered generally hard to work such as stainless steel, AISI types 304 and 316.

The techniques of the present invention are described in more detail hereinafter with respect to the drawings which show a preferred embodiment utilizing two roll clusters of three rolls each and a tapered mandrel.

DESCRIPTION OF THE PREFERRED EMBODIMENTS

Figure 1:
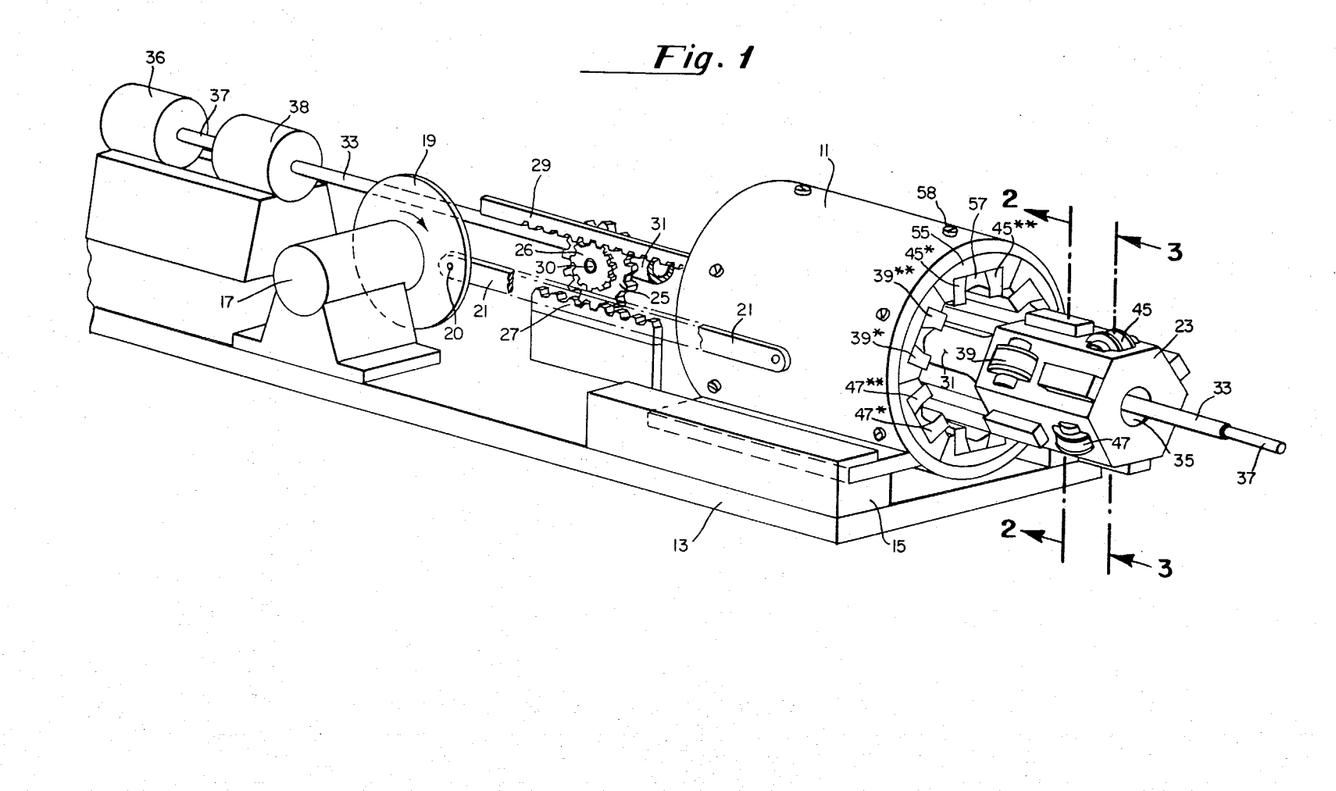
FIG. 1 is a simplified partially exploded view showing essential elements of a rolling mill in which the present invention is utilized.

Referring to FIG. 1, a cam housing 11 is reciprocated relative to a machine frame 13 along a slide 15 in substantially a straight line. An electric motor 17, also attached to the frame 13, drives a flywheel 19. A rod 21 (partially broken away) is connected between the flywheel 19 at a crank pin 20 and the cam housing 11 to convert rotary motion of the flywheel to reciprocable motion of the cam housing. Within the cam housing 11 is a reciprocatable roll housing 23, shown removed from the cam housing for clarity of illustration. A pinion gear 25 engages a rack 27 that is rigidly attached to the frame 13. A second pinion gear 26 engages a rack 29 that is rigidly attached to the cam housing 11. The pinion gears 25 and 26 are concentric about a common axis of rotation 30 and are nonrotatable relative to each other. The reciprocable motion of the axis of rotation 30 of the pinion gear 25 is communicated to the roll housing 23 by means of a connection rod 31 (shown herein as two sections since the roll housing 23 is shown removed from the cam housing 11). The cam housing 11 has a maximum reciprocation stroke distance that is equal to the diameter of the circular path taken by the crank pin 20. From the geometry of the driving engagement of FIG. 1, the roll housing 23 has a maximum reciprocation stroke distance that is equal to the maximum stroke of the cam housing 11 multiplied by the diameter of the pinion gear 25 and then divided by the sum of the diameters of the pinion gears 25 and 26. The use of two pinion gears having different radii as herein has the effect of increasing the length of the working zone along the tube without increasing the stroke length of the cam housing. It should be noted that although the double pinion gear arrangement herein is very convenient for controlling the maximum relative cam housing and roll housing stroke distances, and thereby their relative velocities, other specific mechanical arrangements, such as one employing levers, may also be employed for the same purpose.

Another aspect of the geometry of this arrangement in FIG. 1 is that the cam housing stroke distance is equal to the sum of the roll housing stroke and the working stroke length of the cams (the distance along each cam that contacts a roll trunnion) within the cam housing. It follows, then, that the cam length contacted by each roll bears the same relationship to the roll housing stroke as a ratio of the diameter of the cam housing pinion gear 26 to the diameter of the roll housing pinion gear 25.

A tube 33 to be reduced is inserted through an opening 35 of the roll housing 23, and is carried by a mandrel 37. The mandrel 37 is rigidly held fixed relative to the machine frame 13 by an appropriate gripping device 36, which also provides for removing the mandrel. An appropriate apparatus 38 is provided for positively gripping the tube 33 and linearly advancing (feeding) it over a working length of the mandrel 37. The apparatus 38 can also be designed to rotate the tube at specific positions of the reciprocating cycle in order to produce smooth tubing of reduced size. However, in order to construct finned tubing according to the present invention, the tube is not rotated.

Figure 2:
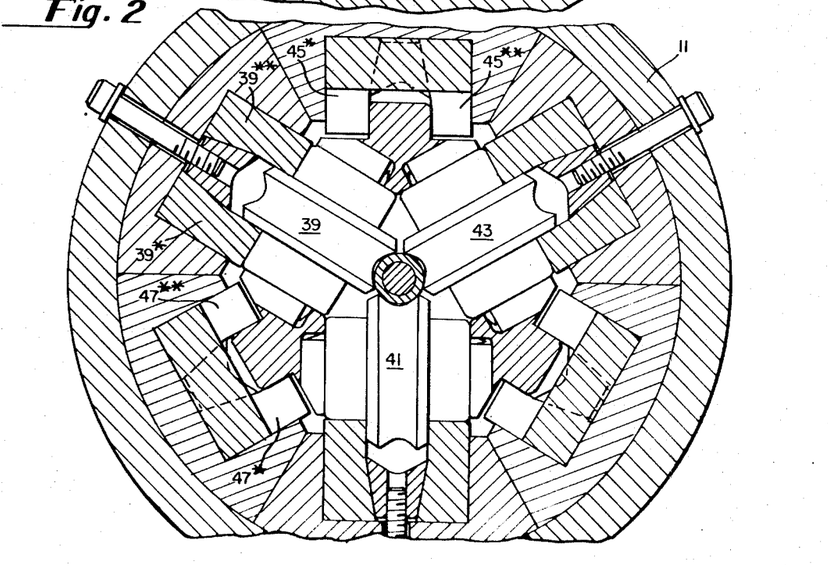
FIG. 2 is a cross-sectional view of FIG. 1 taken through the first stage (set) of rolls at 2—2.
Figure 3:
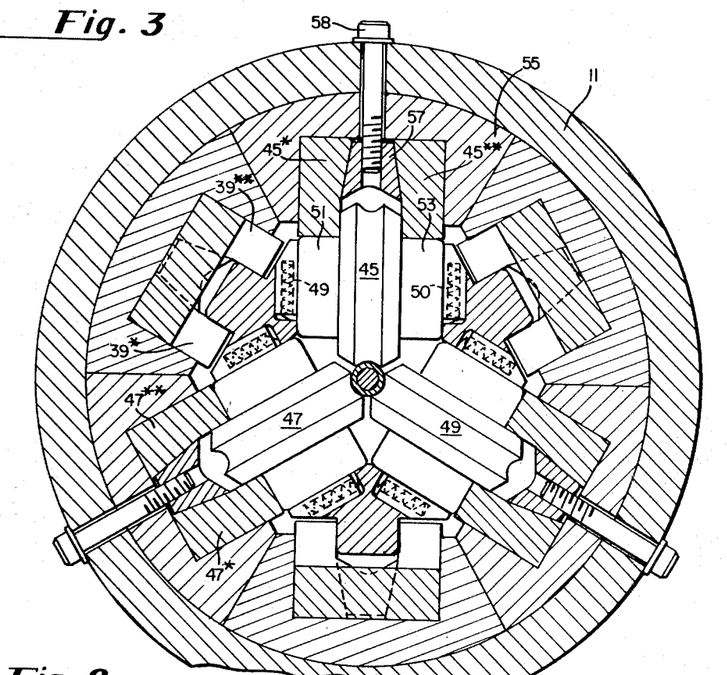
FIG. 3 is a cross-sectional view of FIG. 1 taken through the second stage (set) of rolls 3—3.

FIGS. 2 and 3 better show the relationship of tube deforming rolls and the cam housing as sectional views of FIG. 1. A first set of rolls 39, 41 and 43, shown in FIG. 2, are held in the roll housing 23 with their axes of rotation lying substantially in a plane perpendicular to the mandrel 37 and making an angle of 120° with each other. Similarly, a second set of rolls 45, 47 and 49, shown in FIG. 3, are held by the roll housing 23 in the position that their axes of rotation lie substantially in a plane perpendicular to the mandrel 37 and at a spatially fixed distance along the length of the mandrel from the plane in which the axes of rotation of the first set of rolls 39, 41 and 43 lie. Furthermore, the axes of rotation of the two sets of rolls are angularly displaced from each other by 60°.

Although held by the roll housing 23 against movement relative thereto in the direction of its reciprocation, each roll is free to move in a direction normal to the mandrel. Each roll is resiliently urged by a set of springs (such as springs 49 and 50, each held within a roll guide) out of the roll housing 23 and against its associated cam surfaces. Alternatively, the rolls may be hydraulically urged against their associated cams. Each roll has a trunnion formed on either side thereof, such as trunnions 51 and 53 on either side of the roll 45.

Each roll is associated with a pair of cam tracks upon which its pair of trunnions ride. The two cams associated with each roll are designated herein with the same number as the roll but with an asterisk placed after the reference number of one of the cam tracks and a double asterisk placed after the number referring to the other of the cam tracks. The cams are long metal bars shaped in a manner discussed hereinafter and rigidly attached to the cam housing 11. This attachment is accomplished through a recessed member for each pair of cams, such as a recessed member 55 which is shaped to support the cams 45* and 45**. Notice that the cams 45* and 45** each have a sloped side surface which allows fastening them to the recessed member 55 by a wedge 57 which is attached to the recessed member by a threaded fastener 58.

It should be noted with reference to FIGS. 1, 2 and 3, the ease with which the cam surfaces may be replaced in the cam housing 11 and also the ease with which the rolls may be replaced in the roll housing 23. A given pair of cams are removed by removing their associated wedge. The rolls are merely lifted out of the roll housing 23 when the roll housing is removed to a position as illustrated which is out of the cam housing 11. The mandrel 37 is also easily removed. These features allow quick conversion of the tube rolling mill to receive raw tubes of various sizes and also to produce finished tubes with various wall thicknesses and inside diameters.

Figure 4:
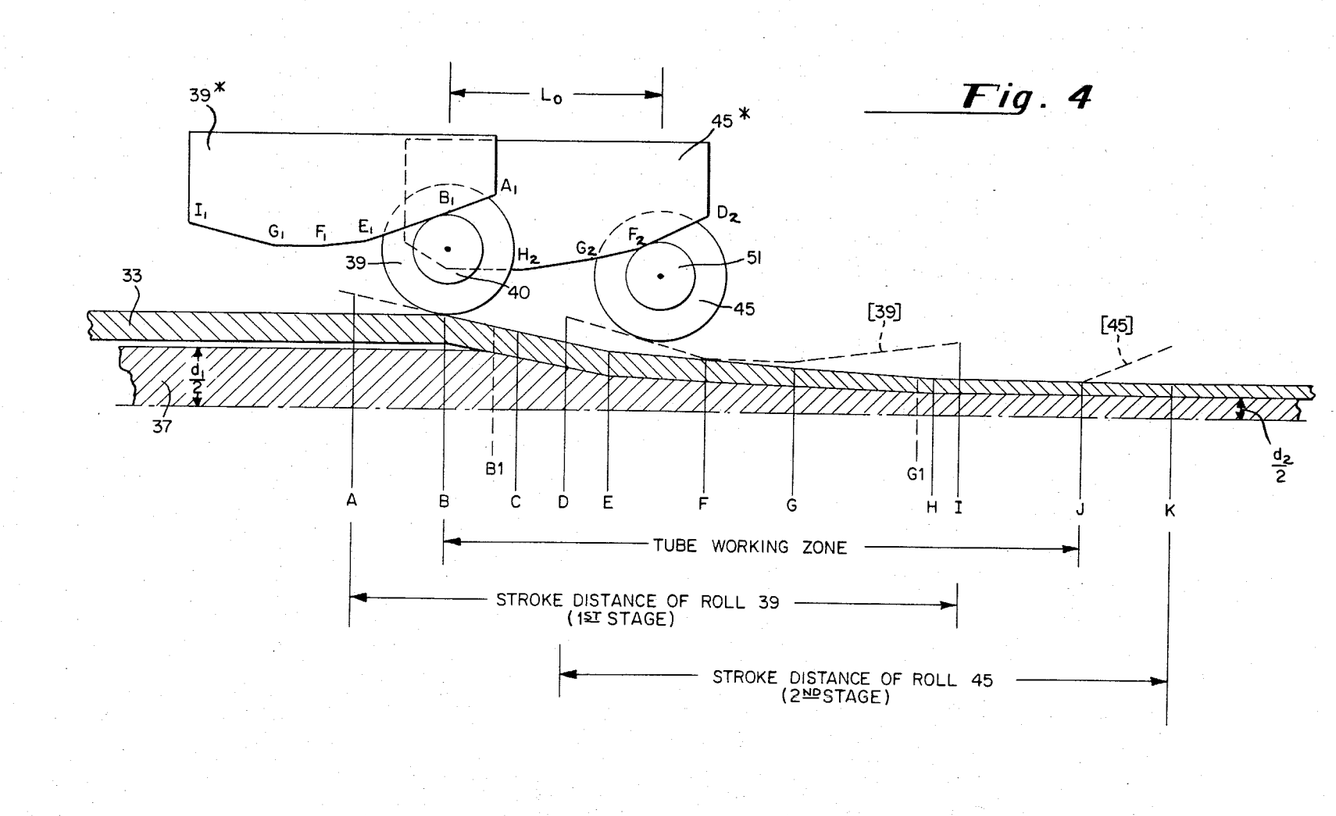
FIG. 4 schematically illustrates the operation of the primary operating components of the rolling mill illustrated in FIGS. 1, 2 and 3.

The schematic diagram of FIG. 4 illustrates operation of the rolling mill illustrated in FIGS. 1, 2 and 3. The mandrel 37 is shown in cross-section along its length which includes a tube working zone B-J wherein at all points therealong the tube 33 is contacted by one or both sets of rolls to accomplish reduction either in wall thickness or inside diameter or both. The mandrel has a diameter $d_1$ at its large end which is something slightly less than the inside diameter of the starting tube 33, thereby allowing the tube to be slid easily over the mandrel. The small end of the mandrel has a diameter $d_2$ which is substantially equal to the desired inside diameter of the reduced tube. The mandrel 37 is gradually tapered within the tube working zone from one of these diameters to the other. This taper is significantly in excess of that required for tube relief. The diameters $d_1$ and $d_2$ may differ by 20 percent or 30 percent or more, depending on the tube inside diameter reduction desired.

In order to demonstrate the cooperation between the cams and the mandrel, one roll from each of the two sets of rolls is shown in FIG. 4 as if they operated in the same plane so that the relationship between them and their cooperation in reducing the tube are illustrated. Rolls 39 and 45 are illustrated in FIG. 4 along with their associated cams 39* and 45*, respectively. The axis of the first stage roll 39 reciprocates along the tube between positions A AND I with a distance therebetween equal to the stroke distance of the roll housing 23 (not shown in FIG. 4) in which the roll 39 is journaled. Similarly, the axis of the second stage roll 45 reciprocates along the tube between positions D and K. The cams 39* and 45* are attached to the cam housing 11 (not shown in FIG. 4) and thereby are reciprocatably driven at a greater velocity than the axis of the rolls, as described hereinabove. The cam 39* contacts a trunnion 40 attached to the roll 39 and the cam 45* contacts the trunnion 51 of the roll 45. The shape of the cams and of the mandrel determine the displacements of rolls downward against the tube to bring about a desired deformation of the tube.

Consider a single working stroke wherein the rolls and cams of FIG. 4 move from their far left hand position to the far right and back again. This represents the extent of movement brought about by a single revolution of the flywheel 19 of FIG. 1. The roll 39 begins at the position A and the roll 45 begins at the position D. As shown by the dashed lines, the roll 39 contacts the tube 33 for the first time at about the position B and the roll 45 contacts the tube 33 for the first time at approximately the position F. Proceeding further to the right, the cooperative shapes of the cams and the mandrel allow the roll 39 to be lifted from the tube 33 at about the position F, as shown by the path [39] of the roll, away from the tube. Similarly, the roll 45 is caused to be lifted from the tube 33 at about the position J, as shown by the path [45] of the roll, away from the tube. The roll 39 arrives at the position I at the same time the roll 45 arrives at the position K to complete the first one-half of the working stroke. The rolls 39 and 45 then move back to their beginning positions A and D, respectively, to complete one working stroke cycle. It may be noted that the "cam working length" as used herein is a horizontal projection of the length of a cam surface contacted by the trunnion. With reference to the cam 39*, the cam working length thereof is the horizontal distance between points $A_1$ and $I_1$.

The tube 33 is advanced (fed) by the apparatus 38 an increment to the right while the rolls are drawn away from contact with the tube, either at one or both ends of the working stroke. As a variation in the system shown in FIG. 4, the cams 39* and 45* may be altered so that the rolls 39 and 45 are not drawn away from the tube at positions I and K, respectively, and the tube is fed only at the beginning of the working stroke. The shape of the tube 33 shown in FIG. 4 within the working zone represents the finished shape thereof after working stroke and before the tube is fed an increment in preparation for the next working stroke.

There are many specific cam and mandrel shapes that may be utilized depending upon the specific tube reduction desired. FIG. 4 illustrates a preferred arrangement for major inside diameter reduction. The following tabulation describes the work done by the roll 39 within the working zone between lettered positions along the length of the tube:

Between B-C: The tube is reduced to intimate contact with the mandrel.

Between C-E: Primarily tube diameter reduction is accomplished by the roll 39.

Between E-F: Primarily wall reduction is accomplished by the roll 39.

The following tabulation describes the work concurrently performed by the roll 45 within the working zone between lettered positions along the length of the tube:

Between F-G: Primarily wall reduction performed by the roll 45.

Between G-H: Primarily wall reduction performed by the roll 45 but with a lesser bite into the tube than between F-G.

Between H-J: This is a finishing zone where there is substantially no taper to the mandrel 37 and with very little bite of the roll into the tube.

To accomplish the above-noted specific tube reductions at various points within the tube working zone, the mandrel has one or more straight line tapers. The cams are shaped cooperatively therewith, each having a plurality of straight line tapers. The cams of FIG. 4 have their roll contacting surfaces marked with subscripted letters corresponding to the lettered positions along the tube. For example, when the roll 39 is positioned at E along the tube, the cam 39* is contacting the trunnion at position $E_1$. Straight line tapers are preferred for the cams and the mandrel since they are easy to machine, although continuous curves may also be employed.

The description herein with respect to FIG. 4 is exemplary only with various changes in the specifics thereof being possible. For example, if major inside tube diameter reduction is not required, the portion $B_1$-$F_1$ of the cam 39* may be shaped differently relative to the portion B-F of the mandrel than as shown to effect tube wall reduction between B-F instead of tube diameter reduction. Also, the elements may be designed so that the rolls 39 and 45 overlap in their work zones along a portion of the tube, preferably with dissimilar cam tapers acting on the two rolls in this common length of the tube. Also, certain applications may require only a single taper along a working length of each of one set of cams. Furthermore, in those cases where little inside diameter reduction is desired, the cams and rolls described herein may be used with a mandrel having little or no taper.

Along any of the portions of the tube length wherein substantial wall thickness reduction is desired, the controlling cam and mandrel tapers are designed for a bite of the rolls into the tube at each point within this portion that is approximately the same percentage of the wall thickness at that point before the roll. This maximizes the efficiency of the fin formation, thereby allowing more work to be accomplished in a shorter portion of the working stroke. Multiple straight line tapers on the cams may be employed to approximate this constant percentage although continuous curved cam surfaces are more exact. The amount of tube feed for each stroke is then adjusted to a maximum for a given tube material just short of that which ruptures the tube, thereby maximizing productivity of the machine.

Figure 5:
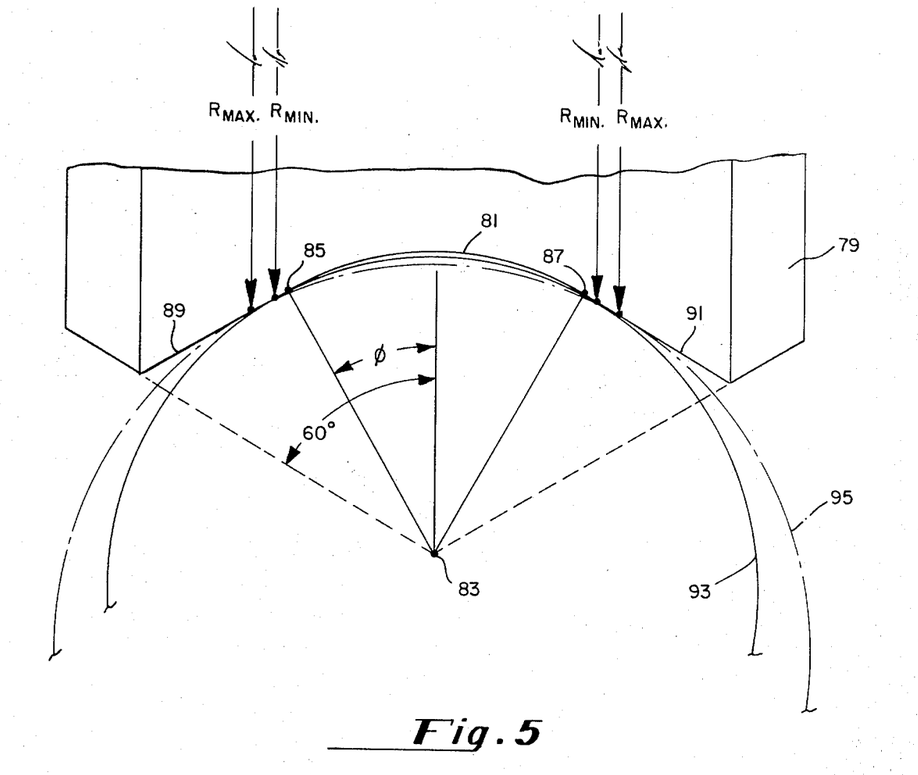
FIG. 5 shows the shape of a preferred tube contacting groove of a roll for use in the rolling mill shown in FIGS. 1-3.

A preferred tube contacting groove is illustrated in FIG. 5 for the rolls of a rolling mill illustrated with respect to FIGS. 1–3. The groove shape is uniform in cross-section at any radial plane thereof. The groove cross-section is shown on a roll 79 which represents relative roll groove dimensions for any roll shown in FIGS. 1–3 for the purpose of describing roll groove design. In the center of the groove is an arcuate portion 81 having a center of curvature at a point 83. Joining either side of the arcuate center portion 81 as tangents thereto at its end points 85 and 87 are straight line segments 89 and 91 which extend to the groove outside edges 97 and 99, respectively. The arcuate portion 81 extends for an angular distance $\phi$ on either side of a center line.

The radius of curvature of the arcuate portion 81 is made substantially equal to or slightly less than the smallest outside tube radius the roll is designed to contact, such outside tube radius being represented by a solid circle 93. This represents a desired radius of the finished tube for the roll 45 shown in FIG. 4 and the radius of the tube at location F for the roll 39. A circle 95 (FIG. 5) represents the largest outside tube radius which the roll groove is designed to contact, that of the beginning tube for the roll 39 of FIG. 4 and that of the tube at position F for the roll 45.

This roll groove design provides two zones of contact for each roll against the outside of the tube between the tube's larger portion 95 and substantially until its smallest portion 93. Such "two-zone rolling" accomplishes more reduction in a given working zone of a tube when compared to a roll groove providing only one zone of contact with the tube. There is, therefore, more metal available for forming fins. Furthermore, non-uniform tube wall strain is reduced as well as resulting degradation of tube quality. Also, required rolling forces, and thus machine wear, are reduced. To optimize these advantages, the radius of the arcuate center portion 81 of the roll groove may be made 1 or 2 percent less than the smallest outside tube radius to be contacted by the roll groove, thereby extending two zone rolling over the entire length of the tube contacted by the roll, whereby roll life is extended. FIG. 5 illustrates such a preferred roll that is designed to contact the tube at two zones throughout the stroke. A rolling radius $r$ of the roll 79 along the tube varies between $R_{max}$ (contacting tube portion 95) and $R_{min}$ (contacting tube portion 93) during each tube reducing stroke. An arcuate center portion 81 with a radius significantly smaller than the finished tube outside radius (in the extreme the groove becomes V-shaped) results in a finished reduced tube surface that is irregular and rough.

For a given tube material, there is an optimum angle $\phi$ which allows the roll to take the most efficient maximum bite into the tube, thereby resulting in the most rapid feed rate of the tube through the machine. An angle $\phi$ of from 30°–38° is satisfactory for most common tube materials and specific types of reduction.

The tangential portions 89 and 91 of the roll groove are shown in FIG. 5 as straight lines. However, these portions of the groove may, alternatively, be given a curvature with one or more finite radii of curvature.

Figure 6:
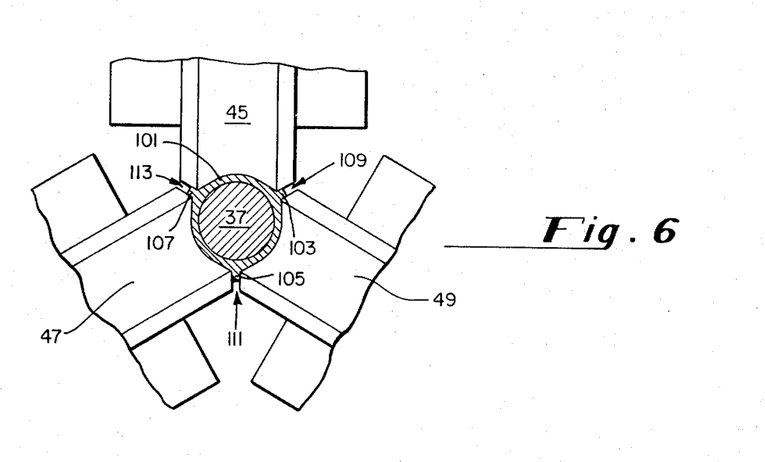
FIG. 6 illustrates the forming of fins on a tube according to one aspect of the present invention.

The rolling mill described with respect to FIGS. 1–5 is used for producing a smooth surface finished tube by rotating the tube at least once each working stroke at a position thereof where the rolls do not contact the tube. It has been found, however, that tubing having fins around its circumference every 120° may be produced on a rolling mill as described in FIGS. 1–5 if the tubing is not rotated at all during its working stroke and if there is adequate minimum spacing between the rolls of the second stage cluster of rolls 45, 47, and 49 when the tube receiving opening formed by the roll grooves is fully closed. The desired spacing between rolls is illustrated in FIG. 6, a modification of FIG. 3, showing the second stage rolls 45, 47 and 49 in a fully closed position about the finished tube (position J of FIG. 4). The finished tube 101, shown in FIG. 6 in cross-section, has fins 103, 105 and 107 formed thereon ever 120° around the tube. The width of each of the fins is directly controlled by minimum spaces 109, 111 and 113 between the rolls when in a fully closed position. These sizes of the minimum spaces 109, 111, and 113 are controlled by the cams on which the three rolls ride.

FIG. 6 has been described as if only a single set of rolls 45, 47, and 49 were operating against the tube. However, for effecting a significant tube inside diameter reduction at the same time that the fins are formed, both rolling stages shown in FIGS. 1-4 are preferably utilized. The first stage rolls 39, 41 and 43 will form a set of three fins spaced 120° around the tube at spaces between the rolls. Therefore, the fins formed by the first stage rolls are displaced 60° from each of the fins formed by the second stage rolls. The fins formed by the first stage rolls are flatened or rolled out by the second stage rolls 45, 47 and 49 thus leaving only the three fins 103, 105 and 107 on the outside of the finished tube 101.

Figures 7, 8:
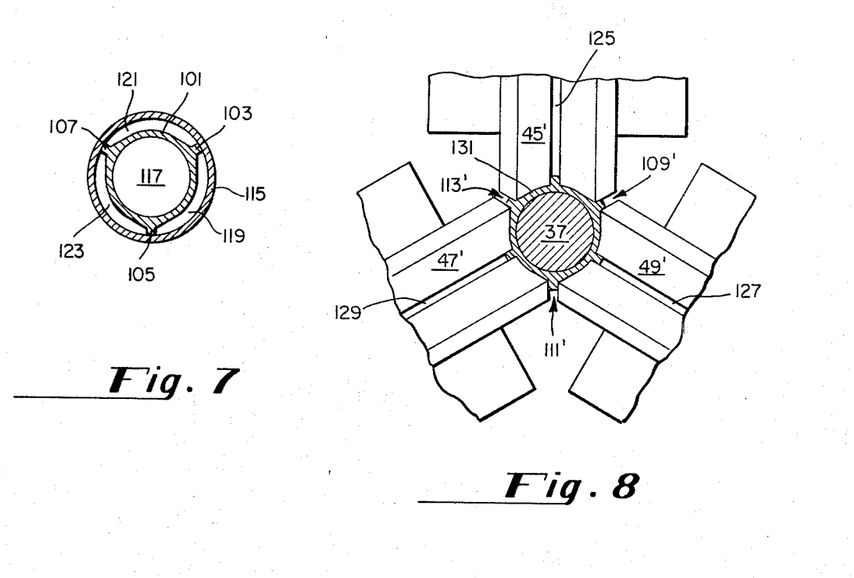
FIG. 7 shows one possible use of a finned tube produced by the arrangement of FIG. 6.
FIG. 8 illustrates the forming of additional fins on a tube according to another aspect of the present invention.

One use for a finned tube 101 is shown in FIG. 7 wherein the fins 103, 105, and 107 acts as spacers to hold the tube 101 concentric within an outer tube 115. The configuration shown in FIG. 7 is often used as a means to transfer heat from a fluid flowing through the center 117 of the finned tube 101 to another fluid flowing through passages 119, 121 and 123 that are formed between the outside surface of the finned tube 101 and the inner surface of the outer tube 115.

The minimum spacings (gaps) 109, 111 and 113 between rolls are shown in FIG. 6 to be substantially equal. The symmetry of all parts about the tube results in the fins 103, 105 and 107 having substantially the same dimensions. However, for some applications it may be desired that the fins be made of unequal width. If so, the cams and/or rolls are given relative dimensions so that the gaps 109, 111 and 113 between the rolls of FIG. 6 are made unequal. In certain applications, it is desired to have a tube with only one fin and this can be effectively accomplished on the rolling mill described herein by making two of the gaps between the rolls of FIG. 6 as small as possible while the third gap is made wider to produce the desired fin. Two of the gaps may be made substantially zero but the resulting contact between their rolls shortens the life of the rolls.

To increase the height of the fins 103, 105 and 107, either the mandrel 37 may be increased in diameter or a raw tube with a greater wall thickness may be used, among other possible adjustments, without changing other machine parameters. In either case, the adjustment results in more metal being made available for forming into fins.

In certain applications of finned tubing, it is desirable to have more than three fins. One reason for desiring more than three fins is to increase the outer surface area of the finned tube for more efficient heat transfer from a fluid flowing within to a fluid flowing without the finned tube. Referring to FIG. 8, each of the second stage rolls 45, 47 and 49 (FIGS. 1-6) have been modified (rolls 45', 47' and 49' of FIG. 8) to include a notch in the center of each roll's tube contacting groove. Notches (channels) 125, 127 and 129 form three of the fins on a tube 131. The other three fins are formed on the tube 131 by the spaces between the three rolls, as described with respect to FIG. 6. The size of the notches in the rolls are generally designed so that the fins formed thereby will extend the same distance from the tube 131 as the fins formed in the spacing between the three rolls. However, it can be seen that the size of the fins can be individually controlled by controlling the spaces between the rolls and the size of the notches in each roll.

The configuration of FIG. 8 illustrates how a finned tube having six fins extending along its length may be manufactured by a single set of rolls. When both sets (stages) of rolls of FIGS. 1-4 are utilized, the notches 125, 127 and 129 of the second stage rolls 45', 47' and 49' line up exactly with the fins formed by the first stage rolls 39, 41, and 43 in the spaces (gaps) between them. In the situation utilizing both sets of rolls, then, the notches 125, 127 and 129 in the second stage rolls contribute to the final shape of the fins produced by the first stage rolls.

In FIG. 8, fin forming or shaping notches are shown on each of the three rolls. Of course, if less than six fins are desired on the finished tube, one or two of the notches may be eliminated. By utilizing only one of the three rolls with a notch in its tube contacting groove and by making the spaces 109', 111' and 113' between the rolls very small, essentially a single fin is formed in a controlled manner while other fins would be very small or non-existent.

Figure 9:
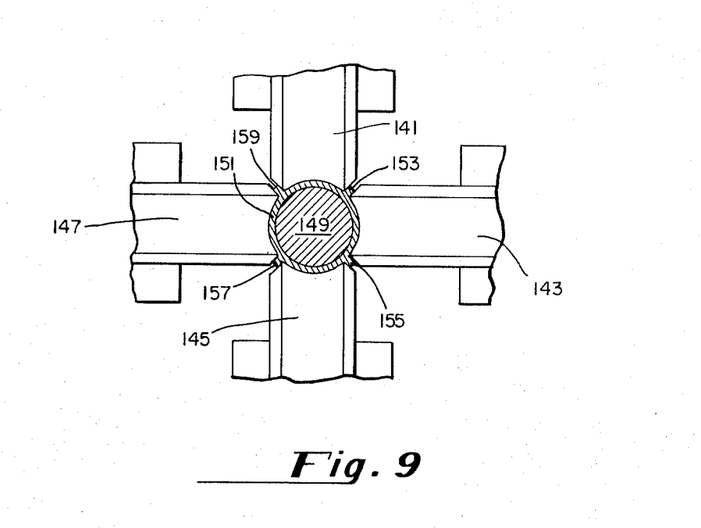
FIG. 9 shows the operation of a cluster of four rolls operating against a tube according to yet another aspect of the present invention.

The present invention has been described in its various aspects with reference to FIG. 1-8 in the environment of a rolling mill employing at least one cluster of three tube contacting rolls. It shall be understood that the invention is not limited to the use of only three rolls. For instance, a cluster of four rolls distributed around a tube to be reduced may be utilized as illustrated in FIG. 9. Rolls 141, 143, 145 and 147 are grouped around a mandrel 149. A tube 151 is reduced thereby. A minimum gap or spacing is provided between the rolls 141-147 by proper design of their individual cams. Formed in the spaces between rolls are fins 153, 155, 157 and 159 that extend along the length of the tube. It can be seen from FIG. 9 that these fins are distributed symmetrically about the circumference of the tube as a result of the rolls being positioned symmetrically about the tube.

It shall be understood that the invention is not limited to the specific arrangements described herein and the preferred embodiments, but that changes and modifications may be made within the scope of the appended claims.

I claim:

1. A method of producing finned tubing from smooth walled tubing by cold rolling, comprising the steps of:

substantially surrounding a smooth walled tube by tube contacting grooves of a first plurality of rolls, the axes of rotation of said rolls lying in a common plane that is substantially perpendicular to the tube, each of said roll grooves having a uniform tube contacting concave shape around the outside of its roll circumference, reciprocating the rolls along the length of the tube between a first position and a second position in space, guiding the rolls along a predetermined path that moves the rolls toward the tube center as they proceed from said first position to said second position during said reciprocation, thereby exerting force on the tube and causing metal to flow, said predetermined path causing the rolls to approach each other with a minimum separation therebetween at said second position but without contact between adjacent sides of at least two adjacent rolls, thereby forming a fin or the tube between said at least two adjacent rolls, said predetermined roll path additionally causing the rolls to be removed from contact with the tube when located near said first position, and advancing the tube an incremental amount during the position in each cycle of reciprocation when the rolls are removed from contact with the tube, said advancement being performed without turning the tube, whereby a length of straight finned tubing is formed.

2. The method according to claim 1 which comprises the additional step of supporting said tube by a mandrel fixed in space and having a substantially uniform cross-section along its length between said first and second positions, whereby the tube wall thickness is reduced as fins are formed without a substantial reduction in inside diameter of the tube.

3. The method according to claim 1 comprising the additional step of positioning said tube over a mandrel, said mandrel being fixed in space and having a significant taper between said first and second positions to provide a substantial reduction in the tube's inside diameter simultaneously with forming fins thereon.

4. The method according to claim 1 wherein at least one of said first plurality of rolls is provided with a notch in its tube contacting groove substantially midway between the roll sides, said notch extending entirely around said roll with a uniform cross-sectional shape, whereby a fin is formed on the tube as a result of the notch.

5. The method according to claim 1 wherein the step of reciprocating rolls includes reciprocating a three roll cluster, said rolls having rotational axes forming a 120° angle with each other.

6. The method according to claim 5 wherein the step of guiding the three roll cluster along a predetermined path causes the rolls to approach each other with equal minimum separation therebetween at said second position, whereby the finned tubing formed has three fins of substantially the same shape separated substantially 120° around the outside of the finished tube.

7. The method according to claim 6 which comprises an additional step of simultaneously reciprocating a second cluster of three rolls along the tube in a manner to trail said first plurality of rolls when traveling from said first position to said second position, said first and second clusters of rolls reciprocating in a fixed spatial relationship with each other along said tube, said second cluster having its rolls arranged with their axes forming a 120° angle with each other and lying in a common plane that is substantially perpendicular to the tube, the axes of the first and second rolls being displaced from each other by 60°.

8. The method according to claim 7 wherein at least one of said first plurality of rolls is provided with a notch in its concave tube contacting groove substantially midway between the sides of said at least one of said first plurality of rolls, said notch extending entirely around said roll with a uniform cross-sectional shape, whereby a fin formed on the tube by a separation between adjacent rolls of said second cluster is shaped by said notch rather than eliminating such a fin by rolling it out.

9. A tube rolling mill, comprising, a mandrel, a plurality of rolls journaled in a roll housing, each of said rolls having a tube contacting groove around its entire circumferential surface, the groove of each roll having a uniform radial cross-sectional shape around its circumferential surface, means for reciprocating said roll housing along a working length of said mandrel in a manner that the grooves of each roll may contact and roll along a tube carried by the mandrel, means for incrementally advancing a tube along the mandrel while preventing turning of the tube, means for constraining said rolls to follow a predetermined path relative to the mandrel during reciprocation of said housing, said predetermined path causing the rolls to approach each other with a minimum separation therebetween at said second position but without contact between adjacent sides of at least two adjacent rolls, thereby forming a fin on the tube between said at least two adjacent rolls, each roll groove shaped in radial cross-section with an arcuate line in a center portion thereof and having a radius of curvature equal to or a few percent less than the smallest tube outside surface radius for which said predetermined roll path provides, said groove additionally including in cross-section symmetrical lines on either side of said arcuate line that are shaped to provide two zones of contact around the tube circumference along substantially the entire working mandrel length for which the mandrel and roll paths are adapted to receive and reduce the tube.

10. A tube rolling mill, comprising:

a mandrel, a plurality of rolls journaled in a roll housing, each of said rolls having a tube contacting groove around its entire circumferential surface, the groove of each roll having a uniform radical cross-sectional shape around its circumferential surface, means for reciprocating said roll housing along a working length of said mandrel in a manner that the grooves of each roll may contact and roll along a tube carried by the mandrel, means for incrementally advancing a tube along the mandrel while preventing turning of the tube, means for constraining said rolls to follow a predetermined path relative to the mandrel during reciprocation of said housing, each roll groove shaped in radial cross-section with an arcuate line in a center portion thereof and having a radius of curvature equal to or a few percent less than the smallest tube outside surface radius for which said predetermined roll path provides, said groove additionally including in cross-section symmetrical lines on either side of said arcuate line that are shaped to provide two zones of contact around the tube circumference along substantially the entire working mandrel length for which the mandrel and roll paths are adapted to receive and reduce the tube, and at least one of said rolls containing in cross-section a notch substantially in the center of its arcuate line groove portion, whereby a fin is formed on a tube by said notch.

* * * * *